United States Patent Office 3,277,741
Patented Oct. 11, 1966

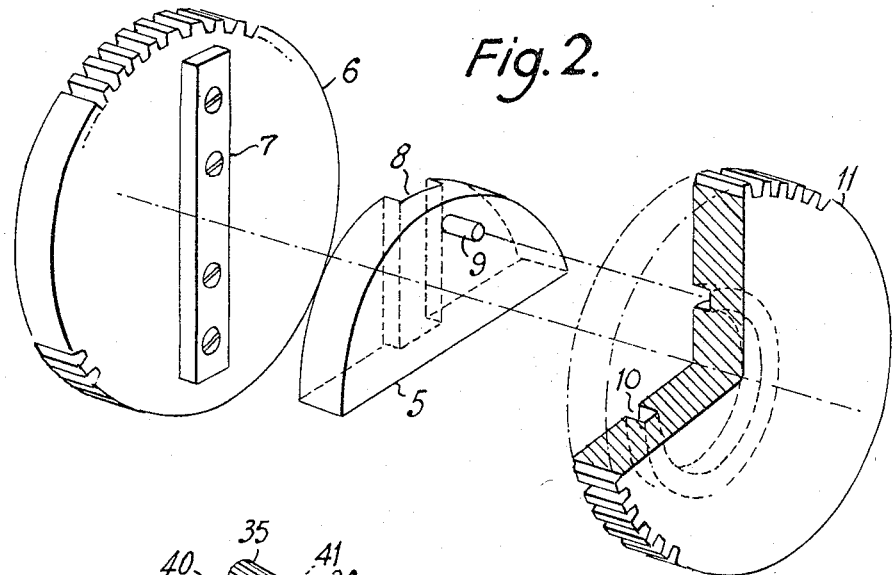
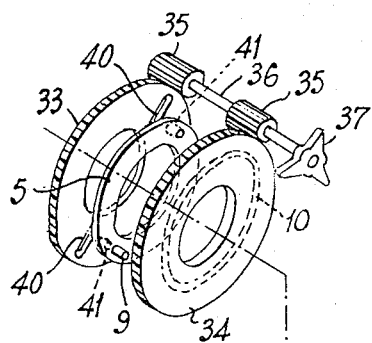
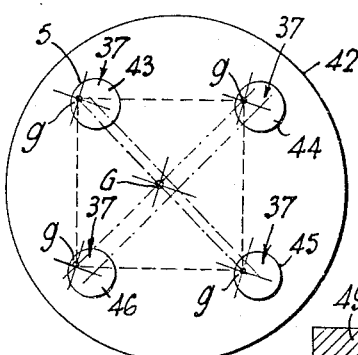
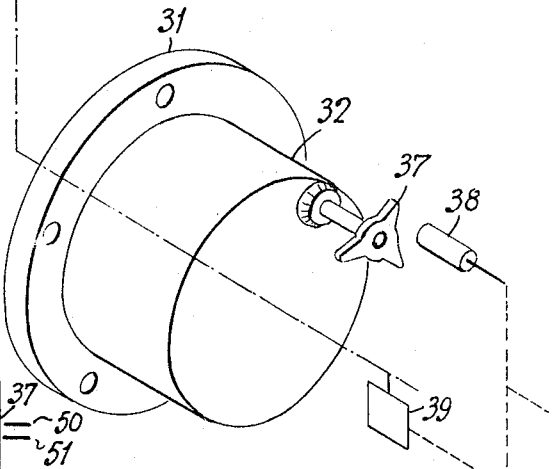

3,277,741
CORRECTION BALANCING OF ROTATING BODIES
Henryk Kaliszer, Edgbaston, Birmingham, and Stephen Vipan Hayes, King's Heath, Birmingham, England, assignors to National Research Development Corporation, London, England, a corporation of Great Britain
Filed Sept. 14, 1964, Ser. No. 396,194
Claims priority, application Great Britain, Sept. 13, 1963, 36,249/63
7 Claims. (Cl. 74—573)

This invention relates to the correction balancing of rotating bodies, for instance grinding wheels.

To correct a grinding wheel for imbalance it is customary to use two or three weights attached in a special balanced collet, close to the wheel. To balance the wheel it is necessary to set the weights so that their resultant effect offsets the imbalance in both phase and magnitude. It is obviously desirable to be able to balance the wheel while it is spinning, but this requires quite elaborate mechanisms to drive the two weights and control their movements while balancing takes place. This is particularly important in the case of grinding wheels because the distribution of mass may vary during the grinding operation.

Generally, according to the present invention, apparatus for balancing a rotating body comprises a single correction balancing mass suitable for mounting for rotation with the body, and means are provided to move the mass radially and/or rotationally relative to the body while the latter is rotating.

Preferably the mass is mounted in a surface rotatable relative to the body about the axis of the latter and lying normal to this axis, and the mounting includes cooperating guides on mass and surface whereby the mass may slide radially over the surface.

Engagement is also made between the mass and a cooperating member also rotatable relative to the body, whereby on relative rotation between surface and member the latter bears against the mass and causes it to slide radially over the surface. The surface may be a face of a gear wheel, and a radial guide on this face may cooperate with a guide on the mass. The member may be mounted on the face of a second gear wheel coaxial with the first. The two gear wheels may be variably linked to a motor whereby they may be simultaneously driven at either the same or different speeds.

The invention also includes an arrangement in which the two gear wheels have different numbers of teeth, whereby engagement of these two wheels with a common driving pinion will cause them to rotate at different speeds so imparting both rotary and radial movement to the mass with which they cooperate.

The invention will now be described by way of explanation with references to the accompanying drawings, in which:

FIGURE 2 is an exploded perspective view showing the grinding wheel, the balancing weight, the parts of the apparatus immediately cooperating with it;

FIGURE 3 is an exploded perspective view of apparatus for balancing the wheel of a vehicle in motion;

FIGURE 4 is a simplified end elevation of an application of apparatus as shown in FIGURE 3, and FIGURE 5 is a diagrammatic axial view through a flywheel balanced by apparatus as shown in FIGURE 3.

Figure 1:
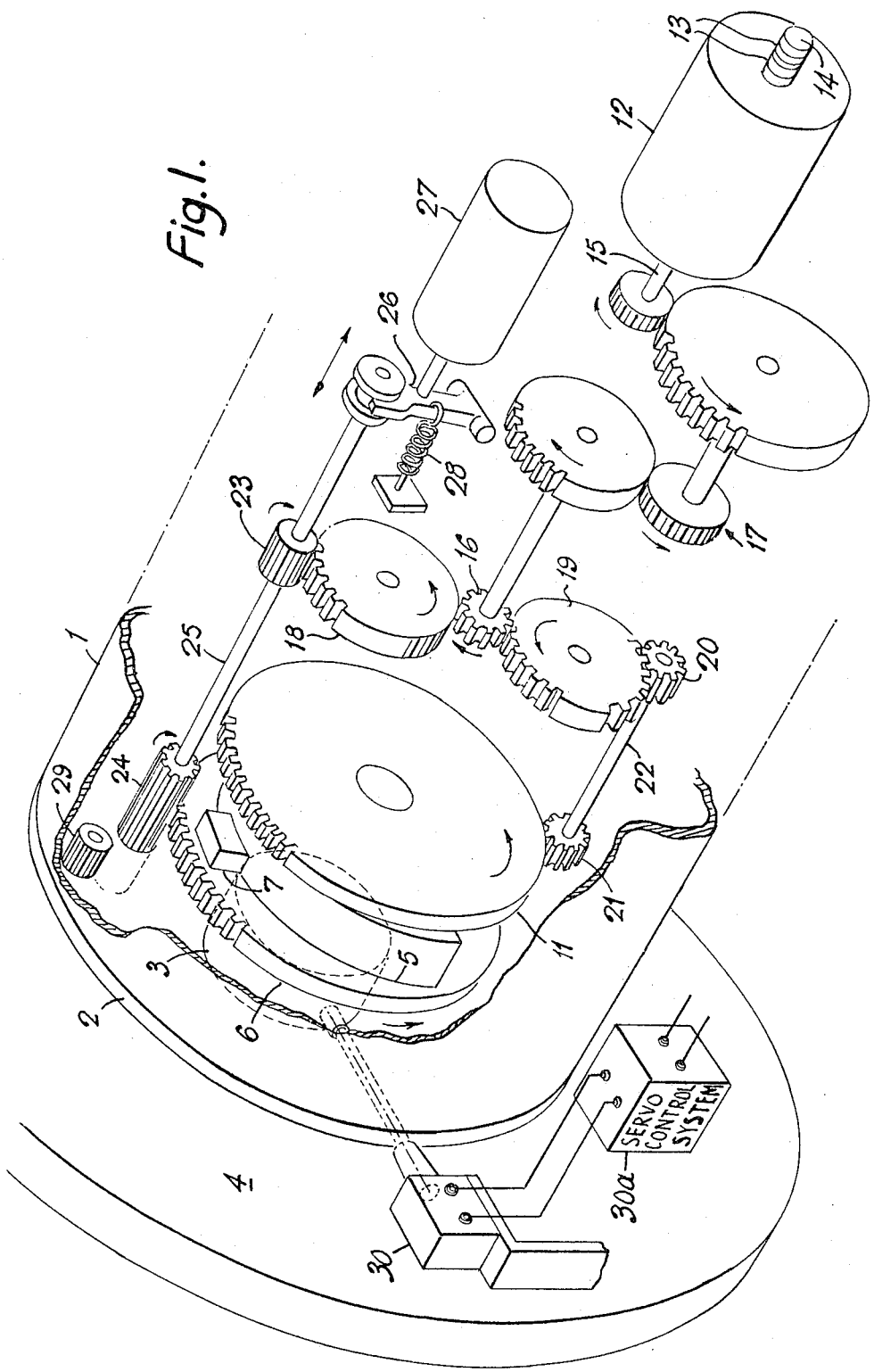
FIGURE 1 is a simplified perspective view showing a grinding wheel and associated balancing apparatus according to the invention.

In FIGURE 1 a cylindrical cage 1 is bolted to a flange 2 mounted on the spindle 3 of a grinding wheel 4. All the remaining parts shown in FIGURE 1 are mounted within the cage 1, and therefore rotate with the grinding wheel. Inside the cage is a semi-circular mass 5 which may be positioned so as to compensate for force imbalance of the wheel 4. The mass 5 is slidably mounted on the face of a gear 6; a rib 7 bolted diametrically across the face of the gear engages with a channel 8 formed in one face of the mass 5. A peg 9 projects from the other face of the mass 5 and registers with a circular cam slot 10 formed in one face of a second gear 11 similar to the gear 6. If the two gears are rotated at the same speed relative to the grinding wheel 4, the phase but not the magnitude of the balancing action of mass 5 upon the wheel will change. If however the gear 11 rotates but the gear 6 is stationary, the action of the slot 10 upon the peg 9 will cause the mass 5 to slide along the rib 7. The magnitude of the balancing action will change, but the phase will not since the gear 6 is still. If the gear 6 alone rotates, or if the two gears rotate but at different speeds, both the phase and the magnitude of the balancing action will change.

It will be noted that the semi-circular mass 5 is of smaller diameter than the gears 6, 11. The diameter of the mass 5 must be such that the mass never fouls the pinion 24 or rod 25 whatever the position of the gears 6, 11. The diameter and eccentricity of the cam slot 10 is such that at one end of its sliding traverse of the rib 7 the centre of gravity of the mass lies on the axis of the wheel 4 and its diameter is coterminous with a chord of the gears 6, 11.

The gears 6, 11 are driven by an electrically reversible electric motor 12 fed with electric power by way of slip rings 13 on a cylindrical stub 14 projecting from the cage 1 coaxially with the spindle 3. The output shaft 15 of motor 12 is connected with a pinion 16 by way of a gear train indicated generally at 17. The pinion 16 engages with two equal gears 18, 19. Whenever motor 12 is running, gear 11 is driven by way of gear 19 and two pinions 20, 21 carried by rod 22. As shown in FIGURE 1, gear 6 is driven in the same sense and at the same speed as gear 11 by way of gear 18 and pinions 23, 24 carried by rod 25. As shown, the plate 26 at the right-hand end of rod 25 is held in engagement with a solenoid 27, which is now energised by current supplied by way of the slip rings 13. When the solenoid is de-energised the rod 25 is moved to the left by a spring 28. Pinion 23 and gear 18 are therefore disengaged, and gear 6 therefore stops spinning; pinion 24 comes to rest in mesh both with gear 6 and with a fixed pinion or spline 29 which locks gear 6 relative to the grinding wheel 4.

To balance the grinding wheel 4 the solenoid 27 is energized first, and then motor 12. Gears 6, 11 then rotate together relative to wheel 4. Vibration of the assembly is noted by a senser 30; it should fluctuate between a maximum, when the centre of gravity of mass and wheel both lie on the line of the same radius of the spindle 3, and a minimum when they lie on opposite radii. If an increasing amplitude of vibration is detected, the direction of rotation of the motor may be reversed so that the minimum may be more quickly reached without passing through the maximum. When the minimum is reached, the rib 7 lies in the plane of the radius concerned, and the solenoid 27 is de-energised, so disconnecting the gear 6 from the motor 12, which now causes the gear 11 to rotate alone and so change the magnitude of the effect of the mass 5 by sliding it along the rib 7. A position should be found at which the mass exactly compensates for the force imbalance of grinding wheel and other masses carried by the spindle 3.

The present invention is especially suited for servo control. The output of senser 30 can be fed into a conventional servo control system 30a which in turn controls the motor 12 and the solenoid 27 through the slip rings 13.

To counteract couple forces acting upon a rotating shaft two units as described may be mounted on the shaft some distance apart. By referring to a senser appropriately placed to detect vibrations due to couple unbalance, the masses 5 of the two units may be separately positioned so that their resultant couple effect balances that of the shaft.

FIGURE 3 shows a unit according to this invention by which a car wheel may be balanced as the car travels, by means taking their power from the energy of the travelling car. A circular plate 31 is mounted over the wheel hub, coaxial with the wheel. Inside a cage 32 which is fixed to the plate, are a balancing mass 5 and two gears 33 and 34, similar to 6 and 11 except that they have unequal numbers of teeth. In the example shown gear 33 has 182 and 34 has 180, and the gears 33 and 34 each mesh with a 16-tooth pinion 35 carried on a rod 36. A 3-point star wheel 37 is mounted on the end of the rod 36 and projects outside the cage 32. The gear 34, corresponding to gear 11 of FIGURE 1, is formed with a cam slot 10. This registers with a peg 9 on the mass 5. The gear 33 corresponding to the gear 6 of FIGURE 1, is formed with radial slots 40 which register with pins 41 on the mass 5. These cause the mass 5 to move relative to the gear 34 in the same way in which the rib 7 and slot 8 caused mass 5 and gear 6 to move relative to each other in FIGURE 1.

A striker 38 is mounted on the car chassis; by means of a control inside the car the driver may either withdraw the striker or move it into its operative position. Once in the latter position it will strike the star wheel once every revolution of the car wheel. The gears 33 and 34 will both then rotate relative to the car wheel, and will rotate slowly relative to each other. As a result the centre of gravity of the mass 5 will acquire both a rotary and a radial movement relative to the car wheel: the former movement will be much faster than the latter. The centre of gravity of the mass will therefore travel a tight spiral relative to the car wheel; somewhere on this spiral path it should come near enough to its optimum position. When the senser 39 indicates that vibration has fallen to a satisfactorily low level, the driver operates his control to withdraw the striker 38.

It will be appreciated that after 45 revolutions of gear 34, with 180 teeth, gear 33, with two more teeth, will have rotated about ½ revolution less. During these revolutions the balancing mass 5 must have passed through both the extreme positions in which it either minimises or supplements most greatly the unbalance of the car wheel. These revolutions of the gears 33, 34, require about 1500 blows of the striker 38 against the teeth of the star wheel 37, i.e. 1500 revolutions of the car wheel. If the circumference of the car tyre is about 6' long, the wheels of a car travelling about 60 m.p.h. make roughly half that number of revolutions per minute.

As a matter of design, it will be understood that the unit shown in FIGURE 3 might be improved, for instance, by using internal teeth for gears 33, 34, and by moving the pinion and striker to an enclosed position. The elements of this form of apparatus could conveniently be simple pressings of thin metal.

As is apparent from FIGURES 1 and 3, the balancing mass may be rotated relative to the body to be balanced either by a power source that rotates with the body or by one that does not. Furthermore it will be understood that there are a great many different types of power train by which the power can be transmitted from the source to the balancing mass, and that the invention is not to be limited to only those disclosed in this specification by way of example. For example, instead of the star wheel 37 shown in FIGURES 3, 4 and 5, a small air turbine can be used driven from a source of compressed air.

Two or more units, as described by way of example with reference to FIGURE 3, may be associated with a rotating body to correct force imbalance.

FIGURE 4 shows four such units mounted on a rotating body 42. The centres of the units 43, 44, 45 and 46 are equispaced around the body and lie on a circle concentric with it. If the units are all set so that the slots 40 on the gears 33 are all parallel, then if the masses 5 of the four units are all equal the resultant balancing effect on the body as a whole will be that of a mass, four times greater than an individual mass 5 and situated at the centre of mass of a quadrilateral having the locations of the individual masses 5 as its vertices. The four units of FIGURE 4 were initially set both with all slots 40 parallel and with the magnitude of the balancing actions of the individual masses 5 equal also. At any chosen time therefore, after a striker has struck the star wheels of each unit an equal number of times, the masses 5 are located one at each vertex of a square, and the centre of the square is the same distance from the axis of the body 42 as the centre of any individual mass is from the axis of its unit.

FIGURE 5 shows a similar application of the invention to a flywheel. Two units 47, 48 are shown recessed in a flywheel 49, with star wheels 37 lying at the same radius from the centre of rotation of the flywheel. Strikers 50, 51 may be moved into register with the star wheels to turn them clockwise and anticlockwise respectively. The units are recessed in the flywheel so that the plane of their correction balancing coincides with that of the centre of mass of the flywheel. The resultant balancing action upon the flywheel will be that of a mass twice as great as the individual masses 5 and lying at the mid point of the line joining them.

As the position of the mass 5 of each unit is related to the number of impulses received by the star wheel since the units were set, it may be possible to interpret the reading of a counter and determine what correction has been applied. For high speed machines a magnetic counter and striker or others that avoid physical contact could be used.

We claim:

1. Apparatus for use in balancing a rotating body, comprising a balancing mass and two adjusting members, means for mounting said mass and said members for rotation with the body, the two adjusting members being angularly movable relative to each other and each being angularly movable relative to the body about an axis of rotation substantially parallel to the axis of rotation of the body, the mass and the first adjusting member having cooperating radial slide means, and the mass and the second adjusting member having co-operating cam means, such that relative angular movement between the first adjusting member and the body causes angular movement of the mass relative to the body and such that relative angular movement between the first and second adjusting members causes radial movement of the balancing mass relative to the body, and drive means operable to cause said relative angular movements.

2. Apparatus according to claim 1 wherein the co-operating cam means is continuous.

3. Apparatus according to claim 1 wherein each adjusting member is a gear wheel.

4. Apparatus according to claim 1 wherein the drive means comprises means operable to drive the two adjusting members at the same speed relative to the body to cause angular movement of the mass relative to the body and also operable to fix the first adjusting member relative to the body and to drive the second adjusting member relative to the first adjusting member and the body to cause radial movement of the mass relative to the body.

5. Apparatus according to claim 4 wherein the drive means includes an electric motor and electrically-actuated means having a first operational position to cause the electric motor, when operating, to drive the two adjusting members at the same speed, and a second operational position to cause the electric motor, when operating, to drive the second adjusting member only.

6. Apparatus according to claim 1 wherein each adjusting member is a gear wheel, the first adjusting gear wheel having a different number of teeth from the second gear wheel, and the drive means includes a common driving pinion engaging the adjusting gear wheels whereby, in operation of the drive means, the adjusting gear wheels rotate at different speeds to cause the mass to move both radially and angularly relative to the body.

7. Apparatus according to claim 6 wherein the drive means further comprises a striker carried by a non-rotating part for driving the driving pinion.

References Cited by the Examiner

UNITED STATES PATENTS

| | | | |
|---|---|---|---|
| 1,392,028 | 9/1921 | Torbet | 74—573 |
| 3,012,820 | 12/1961 | King | 74—573 |
| 3,177,738 | 4/1965 | Achilles | 74—573 |

FRED C. MATTERN, Jr., *Primary Examiner.*

MILTON KAUFMAN, *Examiner.*

W. S. RATLIFF, *Assistant Examiner.*